United States Patent
Cai et al.

(10) Patent No.: US 12,519,499 B2
(45) Date of Patent: Jan. 6, 2026

(54) SHORT DETECTION AND PROTECTION CIRCUIT FOR ACCESS POINT

(71) Applicant: Hewlett Packard Enterprise Development LP, Spring, TX (US)

(72) Inventors: Kehui Cai, Beijing (CN); Bo Wang, Beijing (CN); Hongli Zhang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 605 days.

(21) Appl. No.: 18/049,841

(22) Filed: Oct. 26, 2022

(65) Prior Publication Data

US 2024/0146351 A1 May 2, 2024

(51) Int. Cl.
*H04B 1/40* (2015.01)
*H02H 7/20* (2006.01)
*H04W 88/08* (2009.01)

(52) U.S. Cl.
CPC ............... *H04B 1/40* (2013.01); *H02H 7/20* (2013.01); *H04W 88/08* (2013.01)

(58) Field of Classification Search
CPC ...... H04B 1/00; H04B 1/0458; H04B 1/0475; H04B 1/18; H04B 1/3838; H04B 1/48; H04B 17/00; H04B 17/101; H04B 17/103; H04B 17/20; H04B 2001/0408; H04B 2001/0425; H04B 7/0608; H04B 1/40; H02H 7/20
USPC ......................................................... 455/73
See application file for complete search history.

(56) References Cited

U.S. PATENT DOCUMENTS

| | | | |
|---|---|---|---|
| 8,369,807 B2 | 2/2013 | Mikhemar et al. | |
| 9,667,206 B2 | 5/2017 | Anderson et al. | |
| 10,635,616 B2 | 4/2020 | Chen et al. | |
| 10,735,044 B2 | 8/2020 | Xu | |
| 11,043,985 B1 | 6/2021 | Labadie et al. | |
| 11,190,182 B2 | 11/2021 | Balteanu et al. | |
| 11,211,955 B2 | 12/2021 | Choi et al. | |
| 11,223,332 B2 | 1/2022 | Choi et al. | |
| 2015/0159182 A1* | 6/2015 | Walther | C12Y 401/03024 435/254.2 |

(Continued)

FOREIGN PATENT DOCUMENTS

EP 3843264 A1 6/2021
WO 2014/052413 A1 4/2014

*Primary Examiner* — Ajibola A Akinyemi
(74) *Attorney, Agent, or Firm* — Hewlett Packard Enterprise Patent Department

(57) ABSTRACT

Implementations of the present disclosure relate to a short detection and protection circuit for an access point. The circuit comprises a plurality of front end modules (FEMs), a power source configured to supply power to the plurality of FEMs, a plurality of first switches electrically connected between the plurality of FEMs and the power source, and a plurality of short detection units each electrically connected to a respective FEM of the plurality of FEMs and a respective first switch of the plurality of first switches. With these implementations, by providing the short detection units of the present disclosure, the common power source is electrically isolated in time from the failed or shorted FEM, and the common power source can continue to supply power to other FEMs of good performance. Thus, the access point (AP) can keep working, thereby improving the reliability of the AP.

20 Claims, 7 Drawing Sheets

(56) References Cited

U.S. PATENT DOCUMENTS

| | | |
|---|---|---|
| 2018/0234095 A1 | 8/2018 | Balteanu et al. |
| 2020/0220506 A1 | 7/2020 | Choi et al. |
| 2020/0313703 A1 | 10/2020 | Choi et al. |
| 2021/0083755 A1* | 3/2021 | Kim .................... H04B 1/401 |
| 2022/0337200 A1 | 10/2022 | Choi et al. |

* cited by examiner

SHORT DETECTION AND PROTECTION CIRCUIT FOR ACCESS POINT

BACKGROUND

In an access point (AP) with multiple input multiple output (MIMO) system, there are a plurality of Front-end Modules (FEMs). The FEM in the hardware circuit achieves the transmission amplification of the radio frequency (RF) signal and accepts the amplification, and acts as a role of power detection, controlling and switching.

Generally, to reduce the cost, a common power source is typically shared by the plurality of FEMs. Since all FEMs share the same regulator/DC-DC converter, when one of the FMEs is shorted to ground, the DC power source for all FEMs will also be grounded, and thus all other related FEMs, which share the same power source, will lose the power.

BRIEF DESCRIPTION OF THE DRAWINGS

Through the following detailed descriptions with reference to the accompanying drawings, the above and other objectives, features and advantages of the example implementations disclosed herein will become more comprehensible. In the drawings, several example implementations disclosed herein will be illustrated in an example and in a non-limiting manner, where.

DETAILED DESCRIPTION

As described above, a plurality of FEMs in an AP generally share a common power source. However, when any of the plurality FEMs is shorted, the voltage of the common power source will be adversely affected and even reduced to zero, and all other related FEMs cannot get normal power source and will stop working. Thus, the conventional Access Point has a quite low reliability, and the end customer experience is not that good.

In the typical AP design, most manufacturers use chipset vendor reference design and FEM detection feature, but there is no FEM damage protection and isolation circuit. All of the FEMs in one radio share the same power rail for cost saving. Once one or more of the FEMs are short to ground due to some over stress reasons, all FEMs will lose the power supply and stop working, so the AP will not work.

To address the problems in the typical design as discussed above, example implementations of the present disclosure relate to a FEM short detection and protection circuit. By providing the FEM short detection and protection of the present disclosure, the common power source is electrically isolated in time from the failed or shorted FEM, and the common power source can continue to supply power to other FEMs of good performance, and thus the AP can keep working.

The AP of the present disclosure can still provide service without power up to customers even though one or more FEMs are suddenly short or damaged, so the reliability of the AP with MIMO system can be highly improved with very low additional cost.

The AP is a networking device that allows wireless-capable devices to connect to a wired network. With the development of the wireless communication technology, the AP is provided with multiple input multiple output (MIMO) system, so as to improve the transmission rate and bandwidth utilization of information. Corresponding, the AP is provided with a plurality of FEMs. Communications between the AP and the wireless-capable devices may operate according to the wireless communication protocols such as Institute of Electrical and Electronic Engineers (IEEE) 802.11 standards, Wi-Fi Alliance Specifications, or any other wireless communication standards. The IEEE 802.11 standards may include the IEEE 802.11 ay standard (e.g., operating at 60 GHz), the IEEE 802.11ad standard (sometimes referred to as "WiGig"), the IEEE 802.11be (referred to as "WIFI 7") or any other wireless communication standards.

Hereinafter, the short detection and protection circuit for FEMs in accordance with some example implementations of the present disclosure will be described in detail with reference to FIGS. 1 to 6.

Figure 1:
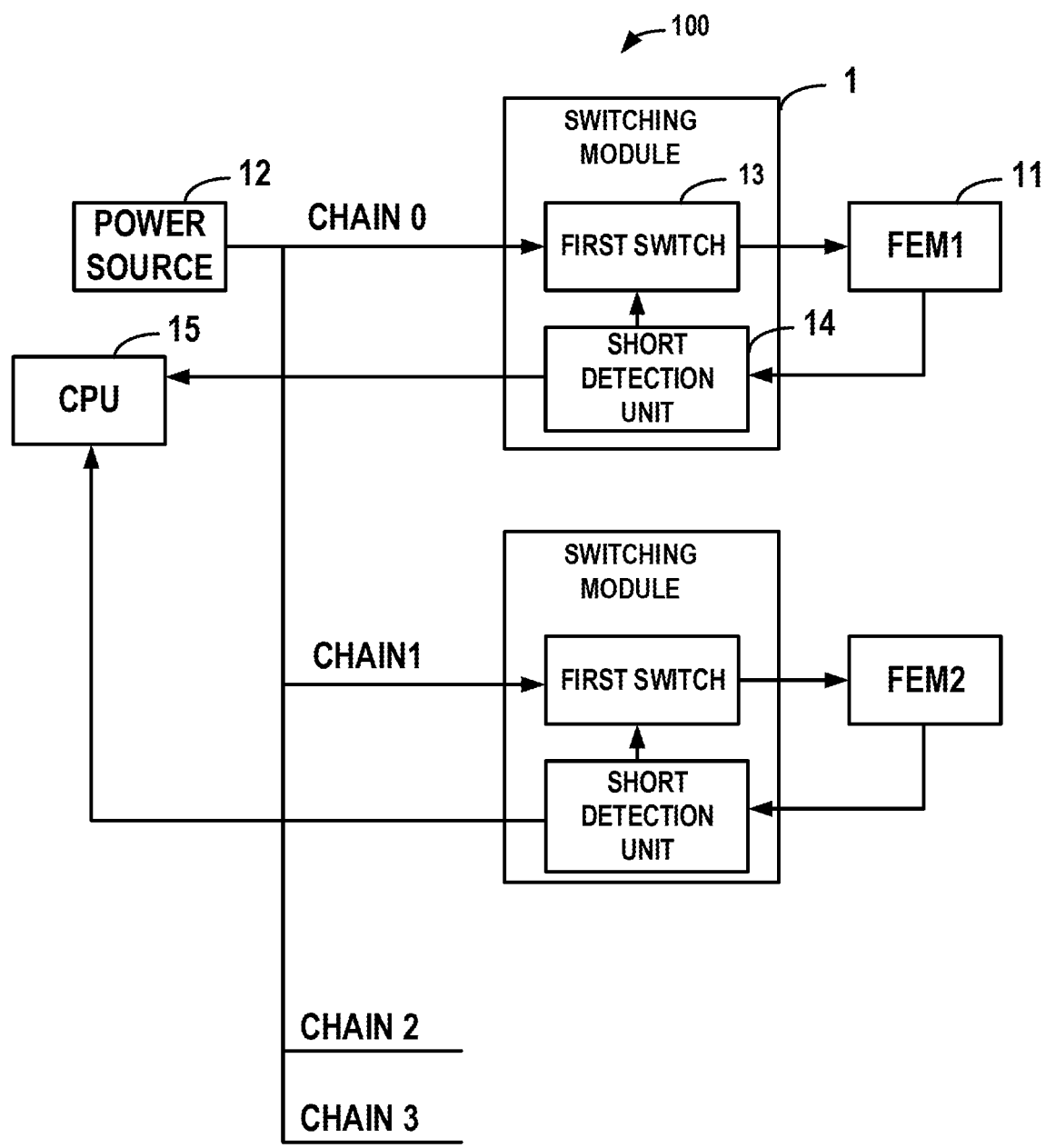
FIG. 1 illustrates a block diagram of an example structure of an AP in accordance with some example implementations of the present disclosure.

FIG. 1 illustrates a block diagram of an example structure of a circuit for preventing an access point from powering down in accordance with some example implementations of the present disclosure. As illustrated in FIG. 1, the AP 100 is provided with M IMO system and a short detection and protection circuit for each FEM path. As illustrated in FIG. 1, the AP 100 comprises a plurality of FEMs 11. The FEM 11 in the hardware circuit achieves the transmission amplification of the RF signal and accepts the amplification, and acts as a role of power detection, controlling and switching. For Wi-Fi products, the FEM may be divided into 2.4G FEM and 5G FEM, which are applied to 2.4G and 5G frequency bands respectively.

Each FEM may be provided with a Power Amplifier (PA), a Low Noise Amplifier (LNA), a switch and Feedback Unit. The PA refers to an amplifier circuit that can output high-power signals. The LNA is an amplifier with very low noise coefficient, and generally used as a high-frequency or intermediate-frequency preamplifier for various radio receivers, and an amplifier circuit for high-sensitivity electronic detection equipment. The switch may control the switching between TX and RX, so that TX and RX share the antenna. The Feedback Unit may feedback a voltage, and the output power is generally linearly related to the feedback voltage value, and the output power can be calculated according to the feedback voltage value.

As illustrated in FIG. 1, the AP 100 further comprises a common power source 12 configured to supply power to the plurality of FEMs 11. As illustrated in FIG. 1, the AP 100 further comprises a plurality of switch modules 1, and each switch module comprises a first switch 13 and a short detection unit 14. Each switch module 1 is provided in each chain, for example any of chain 0, chain 1, chain 2 and chain 3, as shown in FIG. 1. The AP can be provided any other number of chains.

As illustrated in FIG. 1, each first switch 13 is electrically connected between each of the plurality of FEMs 11 and the power source 12. When the first switch 13 is switched on, the power is supplied from the power source 12 to a respective FEM 11. When the first switch 13 is switched off, the power is not supplied from the power source 12 to the respective FEM 11.

As illustrated in FIG. 1, each short detection unit 14 may be electrically connected between the FEM 11 and the first switch 13. When the FEM is shorted to the ground, the voltage thereof will be reduced. The short detection unit 14 is connected to the FEM 11 such that it can sense the change in the voltage of the FEM 11. When sensing the reduction in voltage of the FEM 11, the short detection unit 14 can output a signal to switch off the respective first switch 13 so as to isolate the power source 12 from the respective FEM 11 in time.

In the implementation as illustrated in FIG. 1, only two FEMs, two first switches and two corresponding short detection units are included; however, it should be understood by the person skilled in the art that the number of the FEMs, the short detection units and the first switches included in the access point may be other numbers such that A×B MIMO is formed, wherein A represents the number of antennas of the AP, and B represents the number of antennas of wireless-capable devices.

As discussed above, by providing a first switch 13 between the power source 12 and the FEM 11, the power supply to the FEM 11 can be allowed or prohibited. Further, by providing the short detection unit 14 to sense the voltage or the short of the FEM 11 and to control the first switch 13 based on the sensed voltage, the ON/OFF of the first switch 13 can be controlled based on the voltage of the FEM 11. In this way, when detecting the short in FEM, the first switch 13 can be switched off in time so as to electrically isolate the failed FEM 11 from the power source 12. Therefore, the reduction of voltage of FEM 11 will not affect the power source 12, and other related FEMs 11 can continue to get power supply from the power source 12 and keep working. The reliability of AP 100 can be improved significantly.

Hereinafter, the short detection units and the first switches in accordance with some example implementations of the present disclosure will be described in details with reference to FIGS. 2 to 4.

Figure 2:
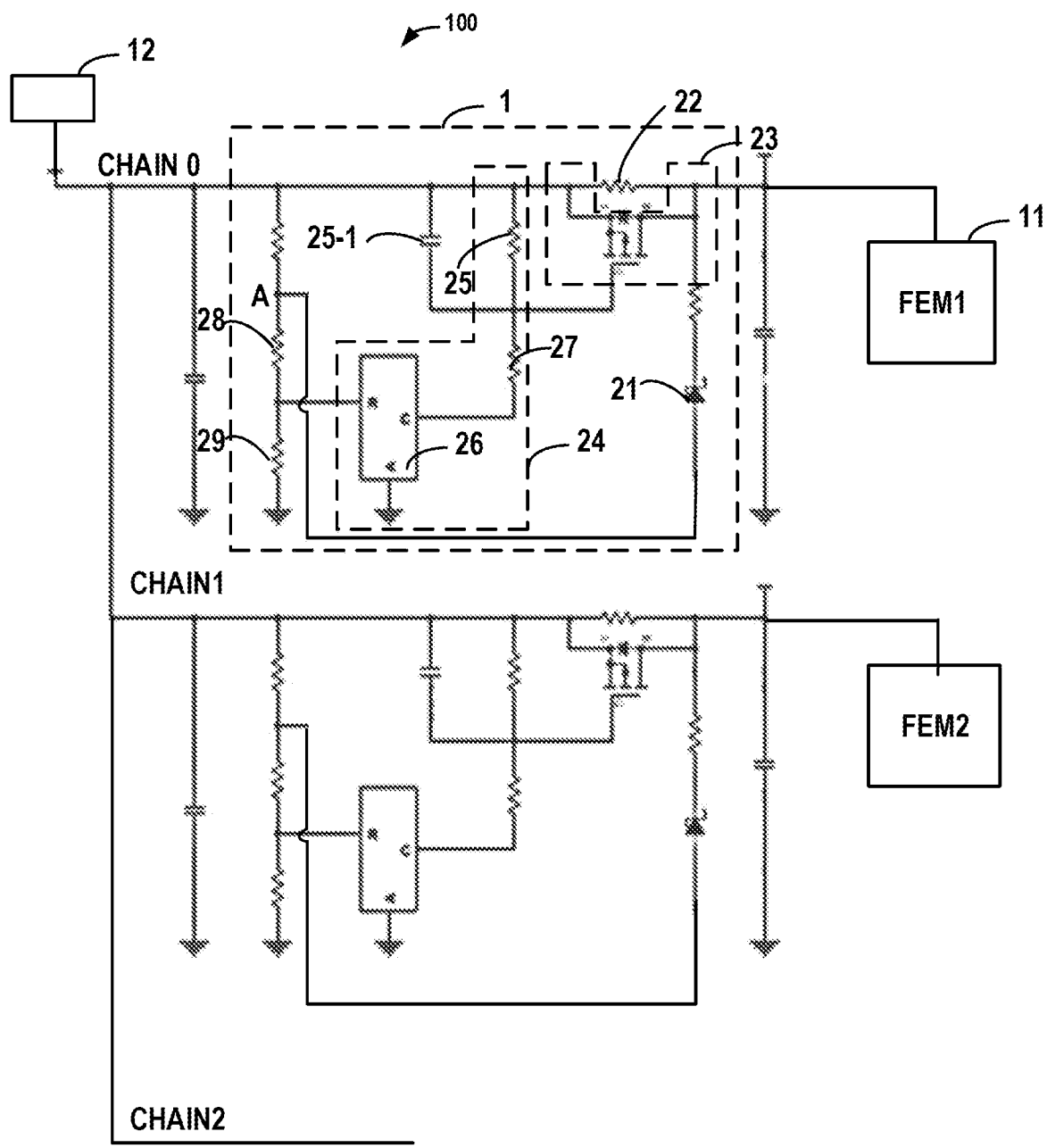
FIG. 2 illustrates an example circuit for preventing an AP from powering down in accordance with some example implementations of the present disclosure.

FIG. 2 illustrates an example circuit for preventing an access point from powering down in accordance with some example implementations of the present disclosure. As illustrated in FIG. 2, the first switch 13 is a PMOS transistor 23, and the short detection unit 14 is a short detection unit 24. A gate of the PMOS transistor 23 is connected to an output of the short detection unit 24, a source of the PMOS transistor 23 is connected to the power source 12, and a drain of the PMOS transistor 23 is connected to the FEM 11. The equivalent resistance of the FEM can be very low when the FEM is shorted to the ground. When Vg is lower than Vs and the Vgs is lower than the Vgs_threshold, the flow path from the source to the drain is permitted, and the power can be supplied from the power source 12 to the FEM 11. When the Vg is higher than Vs, the flow path from the source to the drain is prohibited, and the power cannot be supplied from the power source 12 to the FEM 11.

However, it should be understood that that the first switches also may be a NMOS transistor (not shown), the drain of the NMOS transistor is connected to the power source, the source of the NMOS transistor is connected to the FEM and the gate of the NMOS transistor is connected to the output of the short detection unit 24. When Vg is higher than the Vs and is higher than the Vgs_threshold, the flow path from the drain to the source of the NMOS transistor is turned on. In order to ensure that the Vg is higher than the Vs, the output voltage of the short detection unit typically needs to be boosted such that the voltage at the gate of the NMOS transistor is higher than voltage at the source (which may be a powering-on voltage of the FEM).

In some implementations, as illustrated in FIG. 2, the short detection unit 24 comprises a first resistance 25 and a second switch 26. The first end of the first resistance 25 is connected to the power source 12, and the gate of the PMOS transistor 23 is connected to a second end of the first resistance 25 such that the voltage on the gate of the PMOS transistor 23 may correspond to the voltage at the second end of the first resistance 25.

As illustrated in FIG. 2, the second switch 26 is connected in serial with the first resistance 25 and configured to in response to detecting the short in the FEM 11, switch off such that the voltages at the first end and the second end of the first resistance 25 are equal to each other. Thus, the voltage at the gate of the PMOS transistor 23 is not lower than the voltage at the source of the PMOS transistor 23 so as to switch off the PMOS transistor 23 and isolate the failed or shorted FEM 11 from the power source 12.

Figure 3:
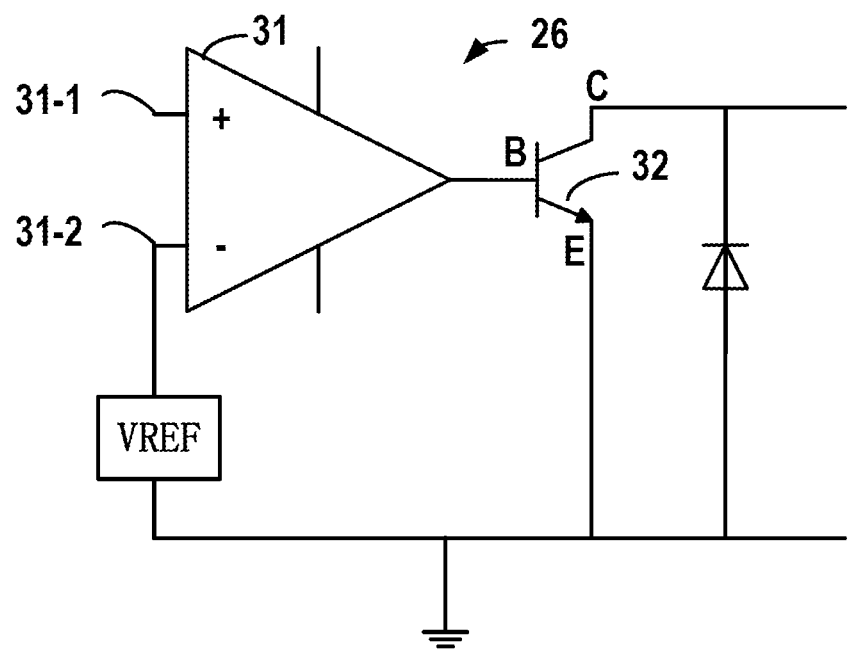
FIG. 3 illustrates an example second switch of the circuit of FIG. 2 in accordance with some example implementations of the present disclosure.

As illustrated in FIG. 3, the second switch 26 comprises a comparator 31 and a triode 32. A first input 31-1 of the comparator 31, such as a positive input, is connected to receive the voltage of the FEM. A second input 31-2 of the comparator 31, such as a negative input, is connected to receive a reference voltage. Optionally, a resistance 28 is connected between the input end of the comparator 31 and the point A for receiving the voltage of the FEM, and a resistance 29 is connected between the input end of the comparator 31 and the ground, such that the comparator 31 can work properly when the input voltage for the input ends is changed dramatically.

As illustrated in FIG. 3, the output of the comparator 32 is connected to the triode 32, such as the base electrode B of the triode 32, so as to control the triode 32 to selectively switch off and switch on. An emitting electrode E of the triode 32 is grounded, and a collecting electrode C of the triode 32 is connected to the second end of the first resistance 25 in serial. Optionally, the collecting electrode C of the triode 32 is connected to the second end of the first resistance 25 through another resistance 27 in serial.

As illustrated in FIG. 3, the voltage of the FEM is input to the positive input of the comparator 32 and the reference voltage is input to the negative input of the comparator 32. On one hand, when the voltage of the FEM is getting lower and thus the input at the positive input is lower than the reference voltage, a low voltage will be output by the comparator 31 and transmitted to the base electrode B of the triode 32 such that the PMOS transistor 23 is switched off such that the power source 12 is isolated from the failed FEM 11, which will be described in detail hereinafter. On the other hand, when the voltage of the FEM is getting higher when powering on the FEM and thus the input at the positive input is higher than the reference voltage, a high voltage will be output by the comparator 31 and transmitted to the base electrode B of the triode 32 such that the PMOS transistor 23 is switched on, and then the power is supplied from the power source 12 to the FEM 11, which will be described in detail hereinafter.

As illustrated in FIG. 3, when a high voltage is applied to the base electrode B of the triode 32 such that the triode 32 is turned on, the collecting electrode C of the triode 32 is electrically connected to the emitting electrode E and is grounded, and there is voltage difference between the first end and the second end of the first resistance 25, such that there is electric current flowing through the first resistance 25. At this moment, the first resistance 25 is functioned as a divider resistance such that the voltage at the second end of the first resistance 25 is lower than the voltage at the first end which is substantively equal to the voltage of power source 12. That is to say, the voltage at the gate of the PMOS transistor 23 is lower than the voltage at the source of the PMOS transistor 23 and Vgs is less than Vgs_threshold, the PMOS transistor 23 is switched on, such that the power can be supplied to the FEM.

As illustrated in FIG. 3, when a low voltage is applied to the base electrode B of the triode 32 such that the triode 32 is turned off, the collecting electrode C of the triode 32 is electrically isolated from the emitting electrode E, and there is no voltage difference between the first end and the second end of the first resistance 25 such that there is no electric current flowing through the first resistance 25. At this moment, the voltage at the second end of the first resistance 25 is equal to the voltage at the first end which is substantively equal to the voltage of power source 12. That is to say, the voltage at the gate of the PMOS transistor 23 is not lower than the voltage at the source of the PMOS transistor 23, the PMOS transistor 23 is switched off such that the power cannot be supplied to the FEM.

Referring back to FIG. 2, and the powering-on of the FEM will be described with reference to FIG. 2. In some implementations, as illustrated in FIG. 2, the AP 100 further comprises a resistance 22 connected in parallel to the first switch 23. The type and the resistance of the FEM fabricated by difference manufactures may be different, and the powering-on voltages for the different FEM when powering on may be different. In order to properly power on the FEMs 11, the powering-on voltages for powering on the FEMs should be adjustable. In some implementations, the resistance 22 is variable resistance such that the low currents flowing there through are different due to different resistances of the resistance 11 and the difference resistance of different FEMs when powering on the FEMs, and different powering-on voltages for different FEMs can be obtained.

In this way, when a proper powering-on voltage for a respective FEM is reached, it is feedback to the point A and then to the positive input of the comparator 31. Since the powering-on voltage is higher than the reference voltage, the comparator 31 outputs a high voltage to the base electrode B of the triode 32 such that the triode 32 is turned on and thus the voltages between the first end and the second end of the first resistance 25 are different, and the voltage of the first end is larger than the second end thereof so as to switch on the PMOS transistor. Due to the lower resistance of the PMOS transistor, a high electric current is flowing through the PMOS transistor and the power is supplied to the FEM through the PMOS transistor 23.

In some implementations, as illustrated in FIG. 2, the voltage of the FEM may be feedback to the point A through a backward diode 21. This backward diode 21 also prevents the current from flowing in an inverse direction from the point A to the FEM.

In some implementations, as illustrated in FIG. 2, a capacitor 25-1 is connected in parallel to the first resistance 25. The capacitor 25-1 can remove the interference having high frequency, and the voltage difference between the first end and the second end of the first resistance 25 can get stable as soon as possible, thereby the Vgs of the PMOS transistor 23 can get stable as soon as possible.

Figure 4:
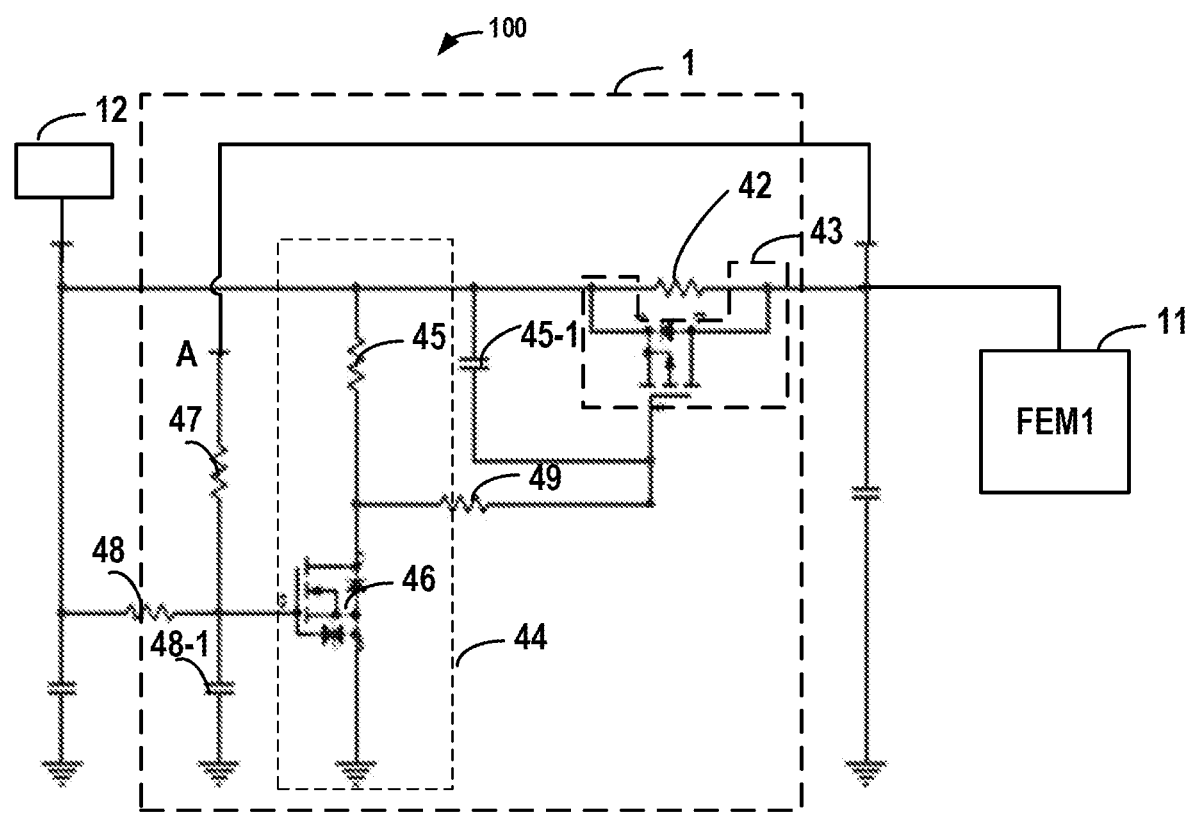
FIG. 4 illustrates another example circuit for preventing an AP from powering down in accordance with some example implementations of the present disclosure.

In some implementations, as illustrated in FIG. 4, the first switch 13 is shown as a PMOS transistor 43, and the short detection unit 14 is shown as a short detection unit 44. A gate of the PMOS transistor 43 is connected to an output of the short detection unit 44, a source of the PMOS transistor 43 is connected to the power source 12, and a drain of the PMOS transistor 43 is connected to the FEM 11. The equivalent resistance of the FEM can be very low when the FEM is shorted to the ground. When Vg is lower than Vs and the Vgs is lower than the Vgs_threshold, the flow path from the source to the drain is turned on, and the power can be supplied from the power source 12 to the FEM 11. When the Vg is higher than Vs, the flow path from the source to the drain is turned off, and the power cannot be supplied from the power source 12 to the FEM 11.

However, it should be understood that that the first switches also can be a NMOS transistor (not shown), the drain of the NMOS transistor is connected to the power source, the source of the NMOS transistor is connected to the FEM and the gate of the NMOS transistor is connected to the output of the short detection unit 24. When Vg is higher than the Vs and is higher than the Vgs_threshold, the flow path from the drain to the source of the NMOS transistor is turned on. In order to ensure that the Vg is higher than the Vs, the output voltage of the short detection unit typically needs to be boosted such that the voltage at the gate of the NMOS transistor is higher than voltage at the source (which may be a powering-on voltage of the FEM).

As illustrated in FIG. 4, the short detection unit 44 comprises a first resistance 45 and a second switch 46. The first end of the first resistance 45 is connected to the power source 12, and the gate of the PMOS transistor 43 is connected to a second end of the first resistance 45 such that the voltage on the gate of the PMOS transistor 43 may correspond to the voltage at the second end of the first resistance 45.

As illustrated in FIG. 4, the second switch 46 is connected in serial with the first resistance 45 and configured to in response to detecting the short in the FEM 11, switch off such that the voltages at the first end and the second end of the first resistance 45 are equal to each other. Thus, the voltage at the gate of the PMOS transistor 43 is not lower than the voltage at the source of the PMOS transistor 43 so as to switch off the PMOS transistor 43 and isolate the failed or shorted FEM 11 from the power source 12.

As illustrated in FIG. 4, the second switch is shown as a NMOS transistor 46. The gate of the NMOS transistor 46 is configured to receive an input representative of a voltage of the FEM 11. The source of the NMOS transistor 46 is grounded, and the drain of the NMOS transistor 46 is connected to the second end of the first resistance 45 in serial. In this way, when a high voltage (for example, a powering-on voltage) is applied to the gate of the NMOS transistor 46 and the Vgs is higher than the Vgs_threshold of this NMOS transistor 46, the source and the drain of the NMOS transistor 46 will be connected to each other, and the voltage at the drain of the NMOS transistor 46 will be the ground voltage. Therefore, the voltage at the first end of the first resistance 45 is higher than the voltage at the second end of the first resistance 45, and thus Vg of PMOS transistor 43 is lower than Vs of the PMOS transistor, and Vgs of the PMOS transistor 43 may be less than a Vgs_threshold so as to switch on the PMOS transistor. On the other hand, when a low voltage (for example, when the FEM is shorted to ground and output a low voltage) is applied to the gate of the NMOS transistor 46, the PMOS transistor 43 will switch off.

In some implementations, as illustrated in FIG. 4, the AP further comprises a resistance 42 connected in parallel to the PMOS transistor 43. The type and the resistance of the FEM fabricated by difference manufactures may be different, and the powering-on voltages for the different FEM when powering on may be different. In order to properly power on the FEMs, the powering-on voltages for powering on the FEMs should be adjustable. In this way, the resistance 42 is variable such that the low current flowing there through is different when powering on the FEMs, and different powering-on voltages can be obtained.

In this way, when a proper powering-on voltage for a respective FEM 11 is obtained, the powering-on voltage is applied to a point A and then to the gate of the NMOS transistor 46 through a resistance 47. As such, the voltage at the gate of the NMOS transistor 46 is higher than the voltage at the source of the NMOS transistor 46, which is ground voltage, and Vgs is higher than Vgs_threshold, and then the NMOS transistor 46 is turned on. When the NMOS transistor 46 is turned on, electric current is flowing through the first resistance 45 and the voltages between the first end and the second end of the resistance 45 is different. Specifically, the voltage at the first end is higher than the voltage at the second end, such that the PMOS transistor 43 is turned on. Then, a high electric current is flowing through the PMOS transistor 43, and the power is supplied to the FEM 11 through the PMOS transistor 43.

When the FEM 11 is shorted to the ground, the voltage thereof will be reduced. The reduced voltage is feedback to the gate of the NMOS transistor 46, such that the Vgs is lower than the Vgs_threshold and the NMOS transistor 46 is turned off. When the NMOS transistor 46 is turned off, electric current is not flowing through the first resistance 45 and the voltages between the first end and the second end of the resistance 45 is equal to each other such that the PMOS transistor 43 is turned off. Then, the power is not supplied to the FEM 11 through the PMOS transistor 43, and the power source 12 is electrically isolated from the failed FEM 11. At the same time, other related FEMs 11 can continue to work properly and can get power supply from the power source 12.

In some implementations, to render the Vgs of the NMOS transistor 46 stable as soon as possible when the Vg thereof is changed dramatically, a capacitor 48-1 and resistances 47 and 48 are connected to the gate of the NMOS transistor 46. For example, the capacitor 48-1 is connected between the gate of the NMOS transistor 46 and the ground. The resistance 47 is connected between the gate of the NMOS transistor 46 and the point for receiving the voltage of the FEM. The resistance 48 is connected between the gate of the NMOS transistor 46 and the power source 12.

In some implementations, to render the Vgs of the PMOS transistor 43 stable as soon as possible when the Vg thereof is changed dramatically, a capacitor 45-1 and a resistance 49 are connected to the gate of the PMOS transistor 43. For example, the capacitor 45-1 is connected in parallel to the first resistance 45. The resistance 49 is connected between the gate of the PMOS transistor 43 and the second end of the first resistance 45. The capacitor 45-1 can remove the interference such that the voltage difference between the first end and the second end of the first resistance 45 can get stable as soon as possible, thereby the Vgs of the PMOS transistor 43 can get stable as soon as possible.

Figure 5A:
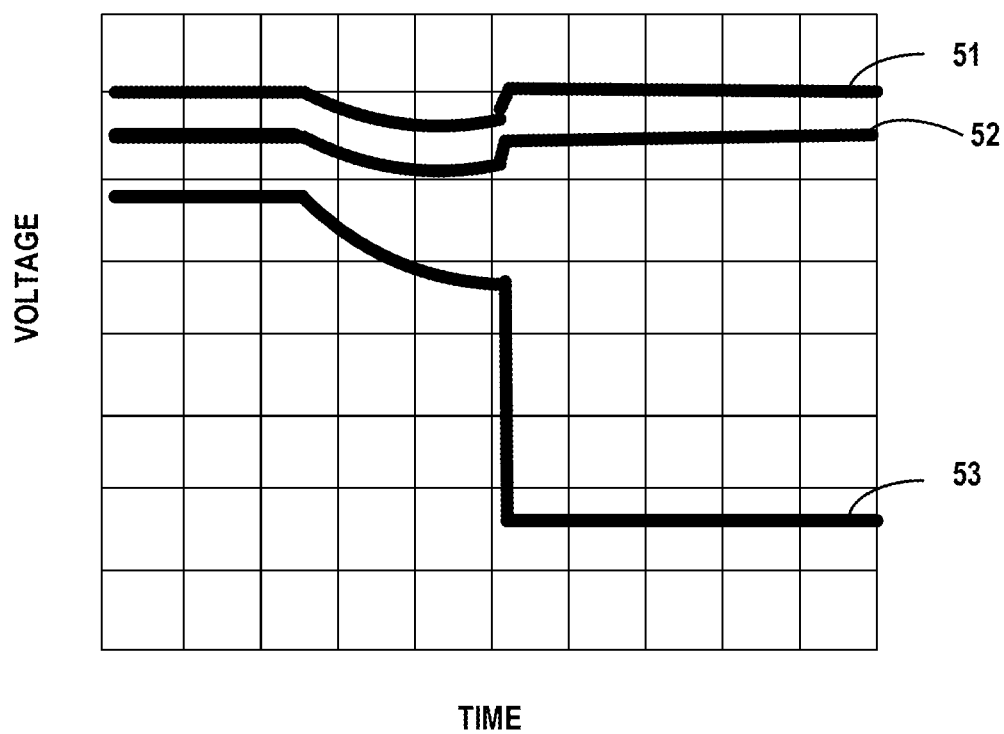
FIGS. 5A to 5B illustrate curves of simulation results in accordance with some example implementations of the present disclosure.
Figure 5B:
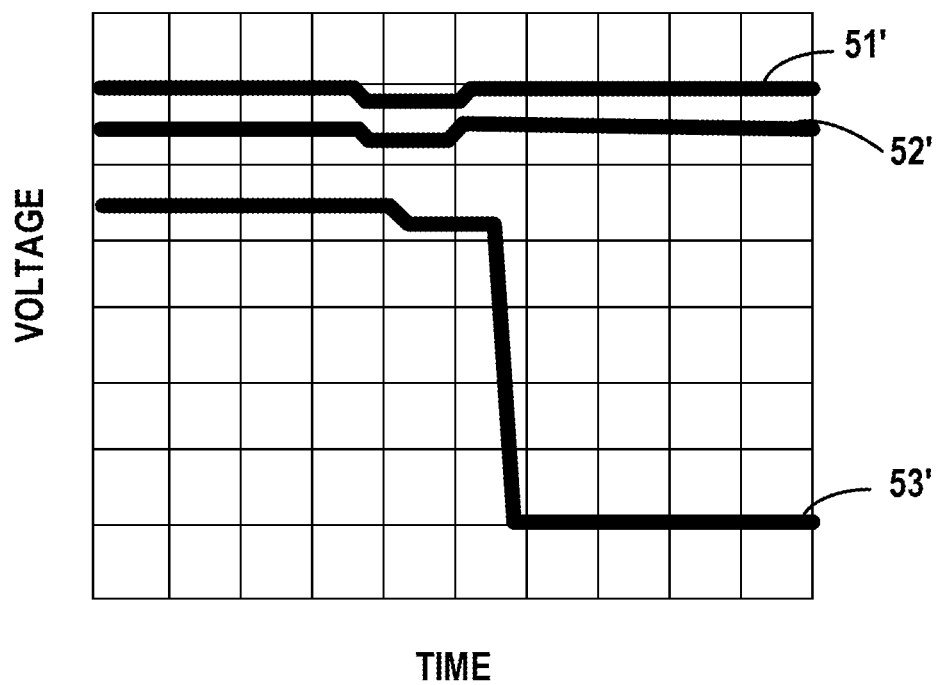

Hereinafter, FIG. 5A and FIG. 5B illustrate curves of simulation results in accordance with some example implementations of the present disclosure. As illustrated in FIGS. 5A and 5B, for the sake of easy explanation, three curves are arranged in the vertical direction and do not overlap with each other so as to illustrate the change of each curve, however the initial voltages of three lines are equal to each other.

As illustrated in FIG. 5A, the first curve 51 depicts the change of the voltage of the power source, the second curve 52 from the top depicts the change of the voltage of the first FEM, and the third curve 53 from the top depicts the change of the voltage of the second FEM. As illustrated in FIG. 5A, during the period that the voltage of second FEM is reduced from the initial voltage to a first voltage, the voltage drops of the first FEM and the power source is quite low and can be negligible. When the voltage of the second FEM is reduced to the first voltage, the PMOS transistor is switched off, and the voltage of the second FEM becomes to be zero, and the voltage of the first FEM and the power source becomes to be the initial voltage. At this moment, the failed second FEM is isolated from the power source, and the power source and the other related FEM can continue to work properly. In one implementation, the initial voltage may be 5V, and the first voltage may be 3.8V.

As illustrated in FIG. 5B, the first curve 51' depicts the change of the voltage of the power source, the second curve 52' from the top depicts the change of the voltage of the first FEM, and the third curve 53' from the top depicts the change of the voltage of the second FEM. As illustrated in FIG. 5B, during the period that the voltage of second FEM is reduced from the initial voltage to a second voltage which is higher than the above-mentioned first voltage, the voltage drops of the first FEM and the power source is quite low and can be negligible. When the voltage of the second FEM is reduced to the second voltage, the PMOS transistor is switched off, and the voltage of the second FEM becomes to be zero, and the voltage of the first FEM and the power source becomes to be the initial voltage. At this moment, the failed second FEM is isolated from the power source, and the power source and the other related FEM can continue to work properly. In one implementation, the initial voltage may be 5V, and the second voltage may be 4.2V. By proving that the second voltage is higher than the first voltage, the PMOS transistor can be switched off more early, and the allowable voltage drop of the failed FEM is much less.

The AP 100 further comprises a central processing unit (CPU) 15. The CPU 15 may communicate with the short detection and protection unit. When detecting that the FEM is properly powered on, the short detection and protection unit can send a first signal to the CPU, and then CPU will allocate data transmission through the powered on FEMs. When detecting a short in any of the plurality of FEMs, the short detection and protection unit can send a second signal to the CPU, and then CPU will recognize that this FEM is shorted to the ground, and cannot work normally again. Then, the CPU will cease data transmission through the failed FEM, and adjust the size of the MIMO system, for example from 4*4 to 3*3.

Figure 6:
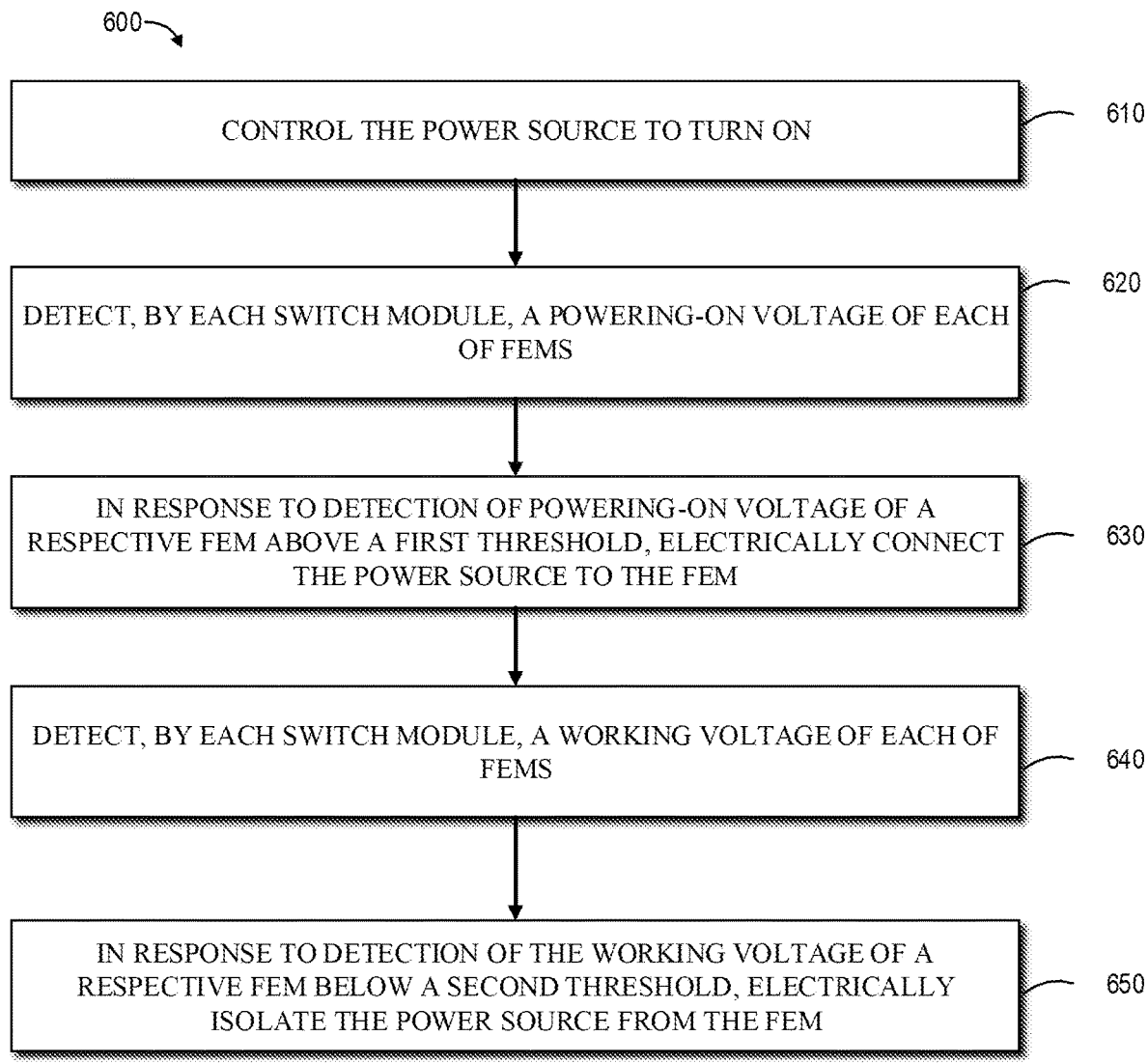
FIG. 6 illustrates a flowchart of a method for controlling an AP in accordance with some example implementations of the present disclosure.

FIG. 6 illustrates a flowchart of a method 600 for controlling an access point in accordance with some example implementations of the present disclosure. The method 600 may be carried out by the AP according to the implementations described herein, such as the AP 100. While only some blocks are shown in the method 600, the method 600 may comprise other operations described herein.

At block 610, the AP controls the power source 12 of the AP 100 to turn on, such that the FEM can be powered on. At block 620, the AP (such as the switch module 1) detects a powering-on voltage of each of the plurality of FEMs 11. The powering-on voltage is lower than a normal working voltage of the FEM. At block 630, in response to detection of powering-on voltage of a respective FEM 11 above a first threshold, the AP (such as the switch module 1) electrically connects the power source 12 to the FEM 11 and supplies power from the power source 12 to the FEM 11. At block 640, the AP (such as the switch module 1) detects a working voltage of each of the plurality of FEMs 11. At block 650, in response to detection of reduction of the working voltage of a respective FEM 11 below a second threshold, the AP (such as the switch module) electrically isolates the FEM 11 from the power source 12 and stops power supply from the power source 12 to the FEM 11. The first threshold is for example 4V, and the second threshold is for example 3V. The first threshold and the second threshold can be different from a FEM to another FEM.

In some example implementations, the switch module 1 comprises a first switch 13 electrically connected between the FEM 11 and the power source 12, and a short detection unit 14 for detecting a voltage of the FEM and a short in the FEM and controlling the first switch to switch on or switch off based on the detected voltage of the FEM. The AP further is configured to in response to that the working voltage of the FEM is reduced below the second threshold when a short in the FEM is detected, control the first switch to switch off so as electrically isolate the FEM from the power source and stop power supply from the power source to the FEM.

In some example implementations, the AP further comprises a variable resistance connected in parallel to the first switch 13 (for example, PMOS transistor 23, 43) such that the respective FEM is capable of turning on and outputting a powering-on voltage. The AP is further configured to in response to that the powering-on voltage of the FEM is increased above the first threshold, control the first switch to switch on so as to electrically connect the power source to the FEM and supply power from the power source to the FEM.

Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A circuit, comprising:
   a plurality of front end modules (FEMs);
   a power source configured to supply power to the plurality of FEMs;
   a plurality of first switches each electrically connected between each of the plurality of FEMs and the power source; and
   a plurality of short detection units each electrically connected to a respective FEM of the plurality of FEMs and a respective first switch of the plurality of first switches,
   wherein each of the plurality of short detection units is configured to detect a short in the respective FEM by detecting a voltage of the respective FEM, and in response to detecting the short in the respective FEM, switch off the respective first switch to cut off a power supplied from the power source to the respective FEM.

2. The circuit of claim 1, wherein each of the short detection units is further configured to detect the voltage of the respective FEM when powering on the respective FEM, and in response to that the voltage of the respective FEM reaches to a powering-on voltage of the FEM, control the first switch to switch on.

3. The circuit of claim 2, further comprising a second resistance connected in parallel to the first switch and configured to be a variable resistance such that the respective FEM is capable of turning on and outputting the powering-on voltage.

4. The circuit of claim 1, wherein the first switch is a PMOS transistor comprising:
   a gate connected to an output of the short detection unit;
   a source connected to the power source; and
   a drain connected to the FEM,
   wherein the short detection unit is configured to:
      in response to detecting the short in the FEM, output a high voltage to the gate of the PMOS transistor to switch off the PMOS transistor corresponding to the shorted FEM.

5. The circuit of claim 4, wherein the short detection unit comprises:
   a first resistance, wherein a first end of the first resistance is connected to the power source, and the gate of the PMOS transistor is connected to a second end of the first resistance such that the voltage on the gate of the PMOS transistor corresponds to the voltage at the second end of the first resistance; and
   a second switch connected in serial with the first resistance and configured to:
      in response to detecting the short in the FEM, switch off such that the voltages at the first end and the second end of the first resistance are equal to each other, so as to switch off the PMOS transistor.

6. The circuit of claim 5, wherein
   the second switch comprises a comparator and a triode connected in serial with the first resistance,
   wherein the comparator comprises:
      a first input configured to receive an input representative of the voltage of the FEM;
      a second input configured to receive an input representative of a reference voltage; and
      an output connected to the triode and configured to in response to detecting that the voltage of the FEM is lower than the reference voltage, output a low voltage to switch off the triode, and
   wherein the triode comprises:
      a base electrode connected to the output of the comparator;
      an emitting electrode configured to be grounded; and
      a collecting electrode connected to the second end of the first resistance.

7. The circuit of claim 6, wherein
   the second switch is a NMOS transistor connected in serial with the first resistance,
   wherein a gate of the NMOS transistor is configured to receive an input representative of the voltage of the FEM;
   a source of the NMOS transistor is grounded; and
   a drain of the NMOS transistor is connected to the second end of the first resistance.

8. The circuit of claim 5, further comprising a first capacitor connected in parallel with the first resistance.

9. The circuit of claim 1, wherein the FEM is connected to the short detection unit through a reverse diode.

10. An access point (AP), comprising:
a circuit including;
a plurality of front end modules (FEMs);
a power source configured to supply power to the plurality of FEMs; and
a plurality of first switches each electrically connected between each of the plurality of FEMs and the power source; and
a plurality of short detection units each electrically connected to a respective FEM of the plurality of FEMs and a respective first switch of the plurality of first switches; and
a central processing unit (CPU) communicating with the plurality of short detection units,
wherein the CPU is configured to:
in response to a short in the respective FEM being detected by one of the plurality of short detection units, stop data transmission through the respective FEM.

11. The AP of claim 10, wherein the CPU is further configured to:
control the power source to power on; and
in response to that a powering-on voltage of the respective FEM is detected by one of the plurality of short detection units, enable data transmission through the FEM.

12. The AP of claim 11, further comprising a second resistance connected in parallel to the first switch and configured to be a variable resistance such that the respective FEM is capable of turning on and outputting the powering-on voltage.

13. The AP of claim 10, wherein
the first switch is a PMOS transistor comprising:
a gate connected to an output of the short detection unit;
a source connected to the power source; and
a drain connected to the FEM,
wherein the short detection unit is configured to:
in response to detecting the short in the FEM, output a high voltage to the gate of the PMOS transistor to switch off the PMOS transistor corresponding to the shorted FEM.

14. The AP of claim 13, wherein the short detection unit comprises:
a first resistance, wherein a first end of the first resistance is connected to the power source, and the gate of the PMOS transistor is connected to a second end of the first resistance such that the voltage on the gate of the PMOS transistor corresponds to the voltage at the second end of the first resistance; and
a second switch connected in serial with the first resistance and configured to:
in response to detecting the short in the FEM, switch off such that the voltages at the first end and the second end of the first resistance are equal to each other, so as to switch off the PMOS transistor.

15. The AP of claim 14, wherein
the second switch comprises a comparator and a triode connected in serial with the first resistance;
wherein the comparator comprises:
a first input configured to receive an input representative of the voltage of the FEM;
a second input configured to receive an input representative of a reference voltage; and
an output connected to the triode and configured to in response to detecting that the voltage of the FEM is lower than the reference voltage, output a low voltage to switch off the triode, and
wherein the triode comprises:
a base electrode connected to the output of the comparator;
an emitting electrode configured to be grounded; and
a collecting electrode connected to the second end of the first resistance.

16. The AP of claim 10, wherein the FEM is connected to the short detection unit through a reverse diode.

17. The AP of claim 14, wherein
the second switch is a NMOS transistor connected in serial with the first resistance,
wherein a gate of the NMOS transistor is configured to receive an input representative of the voltage of the FEM;
a source of the NMOS transistor is grounded; and
a drain of the NMOS transistor is connected to the second end of the first resistance.

18. A method for controlling an access point (AP), the AP comprising a power source, a plurality of front end modules (FEMs) and a plurality of switch modules each electrically connected between each of the plurality of FEMs and the power source, comprising:
controlling the power source to turn on;
detecting, by each of the plurality of switch modules, a powering-on voltage of each of the plurality of FEMs;
in response to detection that the powering-on voltage of a respective FEM is above a first threshold, electrically connecting the power source to the FEM;
detecting, by each of the plurality of switch modules, a working voltage of each of the plurality of FEMs; and
in response to detection that the working voltage of a respective FEM is reduced below a second threshold, electrically isolating the FEM from the power source.

19. The method of claim 18, wherein
each of the plurality of switch modules comprises:
a first switch electrically connected between the FEM and the power source; and
a short detection unit for detecting a voltage of the FEM and a short in the FEM and controlling the first switch to switch on or switch off based on the detected voltage of the FEM,
wherein electrically isolating the FEM from the power source comprises:
in response to that the working voltage of the FEM is reduced below the second threshold when a short in the FEM is detected, controlling the first switch to switch off.

20. The method of claim 19, wherein the AP further comprises a variable resistance connected in parallel to the first switch such that the respective FEM is capable of turning on and outputting a powering-on voltage,
wherein electrically connecting the power source to the FEM comprises:
in response to that the powering-on voltage of the FEM is increased above the first threshold, control the first switch to switch on.

* * * * *